May 12, 1931.  V. J. DAVIS  1,804,401
MOLDING APPARATUS AND EQUIPMENT FOR FORMING THE SAME
Filed Jan. 11, 1928  3 Sheets-Sheet 1
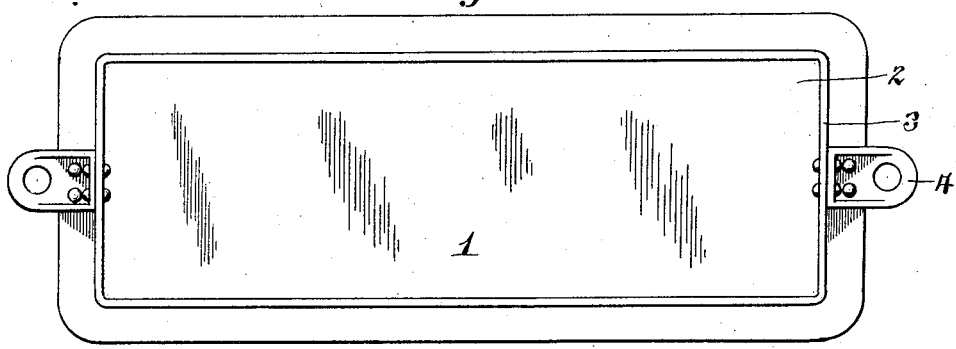
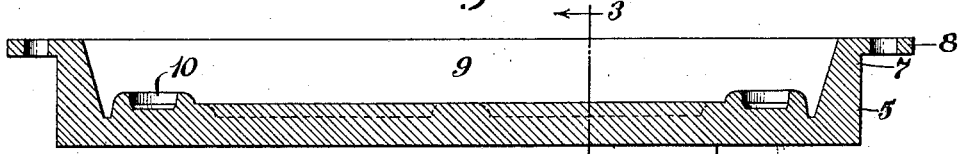
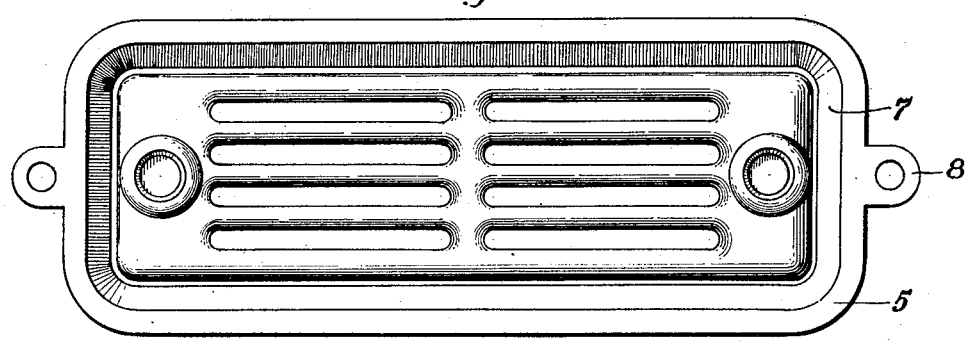
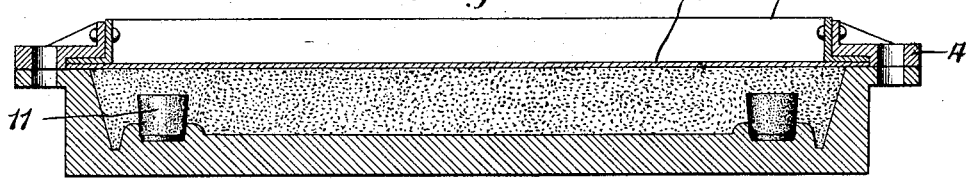
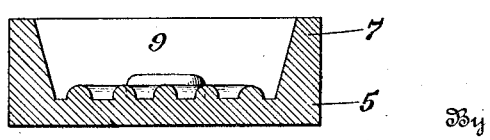
Inventor
Vernon J. Davis
By Popp and Powers
Attorney

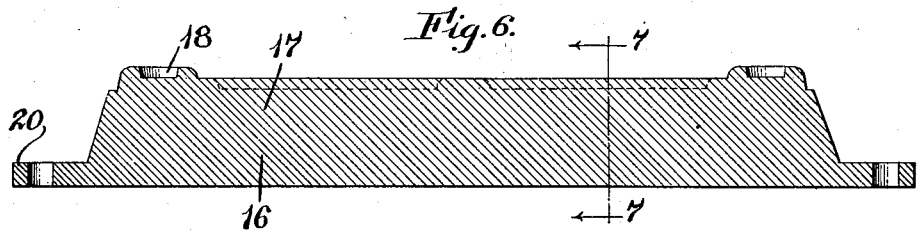
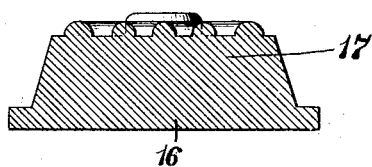
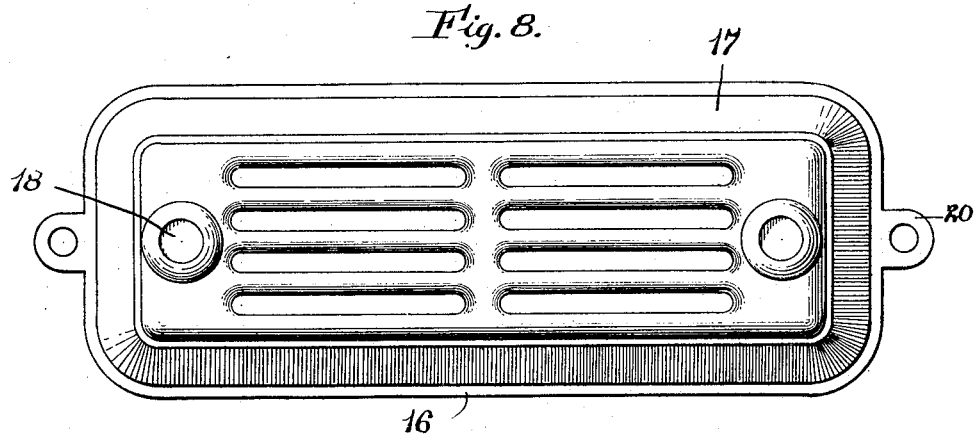

May 12, 1931. V. J. DAVIS 1,804,401
MOLDING APPARATUS AND EQUIPMENT FOR FORMING THE SAME
Filed Jan. 11, 1928 3 Sheets-Sheet 3

Inventor
Vernon J. Davis
By Poppard Powrs.
Attorney

Patented May 12, 1931

1,804,401

UNITED STATES PATENT OFFICE

VERNON J. DAVIS, OF BUFFALO, NEW YORK

MOLDING APPARATUS AND EQUIPMENT FOR FORMING THE SAME

Application filed January 11, 1928. Serial No. 245,977.

This invention relates to the art of forming molds and involves improvements in both the equipment for forming the mold sections and the apparatus comprising the mold.

The subject matter of the present invention is disclosed but not claimed in my companion application filed August 19, 1927, and serially numbered 214,057. Such application is directed to the casting of hollow bodies and involves the method of "preparing" the mold and the resultant "prepared" mold structure. The features of that application center around the provision and arrangement of individual end cores together with the novel form and arrangement of chaplets.

The principal objects of the present invention are to simplify the procedure of forming the mold sections, to reduce the amount of sand ordinarily utilized in such forming operation, to eliminate the drag flask and to reduce the weight of the mold thereby facilitating its manipulation.

Another object of the invention is to provide a novel drag plate construction which will function to support and position the drag section accurately with respect to the cope section of the mold.

In the practice of the invention, the mold sections are separately formed and then secured together to provide the complete mold. The drag section is formed in a pattern having a flared sand receiving chamber which is fashioned to form or shape the sand with one part of the mold outline after which the formed sand is transferred to, and positioned accurately on, a drag plate. The cope section is formed in the cope flask with a flaring chambered parting sand face which is formed with the other part of the mold outline. The sections of the mold thus formed are aligned with each other and secured together in a manner such that the drag section fits closely into the flared chamber of the cope section and cooperates therewith to outline the complete mold in a position substantially displaced or offset from the plane at which the drag plate and cope flask meet or abut.

The invention has particular utility in connection with the casting of hollow bodies and is illustrated in the accompanying drawings as applied to the casting of a standard radiator section.

In the drawings:—

Figure 1 is a plan view of the bottom of the drag plate.

Figure 2 is a sectional view of the drag pattern.

Figure 3 is a sectional view along line 3—3 of Fig. 2.

Figure 4 is a plan view of the drag pattern.

Figure 5 is a sectional view of the formed drag section in the pattern with the drag plate in position.

Figure 6 is a sectional view of the cope pattern.

Figure 7 is a sectional view along line 7—7 of Fig. 6.

Figure 8 is a plan view of the cope pattern.

Figure 9:
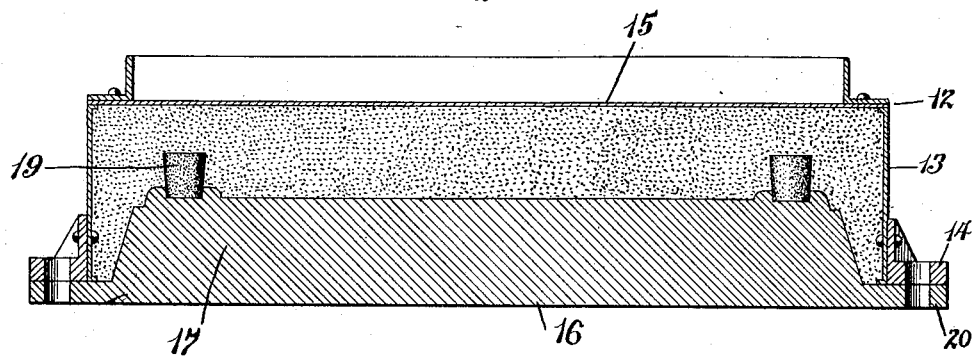
Figure 9 is a sectional view of the formed cope section in the flask with the pattern and top plate in position.

The drag section of the mold comprises a drag plate as indicated at 1, which is preferably made of steel and includes a flat plate 2 to the under side of which angle bars 3 are suitably secured thereby providing a support for the plate. The drag plate must be capable of accurate alignment with both the cope section of the mold and the drag pattern and for this purpose is provided with pin ears or lugs 4 riveted or otherwise suitably secured thereto.

As stated previously, the drag section of the mold is formed in the drag pattern and to this end, a pattern as 5, is utilized. The pattern comprises a body 6 having upwardly extending sides 7 which carry end positioning lugs 8. The inner faces of the sides 7 are convergingly inclined toward the body of the pattern and outline a flared sand receiving chamber 9. The bottom or horizontal face of the chamber 9 is suitably fashioned with the desired mold outline which, in this case is a standard radiator section. The bottom is also provided with suitable recesses 10 for the accommodation of the end cores 11, which in this type of molding are made separate from the main core thereby providing certain advantages as disclosed in the companion application previously noted.

In forming the drag section, the end cores 11 are placed in the recesses 10 and the chamber 9 filled with sand which is firmly packed throughout the chamber either manually or mechanically. After this operation the open sand face is leveled so as to lie even with the upper edge of the pattern sides and the drag plate is placed over the pattern and aligned therewith by means of the plate lugs 4 and the pattern lugs 8. The plate and pattern are now inverted as a unit and the pattern removed. By such procedure the drag section is completely formed in the pattern and then transferred to and aligned or positioned accurately on the drag plate.

The cope section of the mold comprises a cope flask 12 having sides 13 which are of a height sufficient to permit the mold outline to be formed deeply within the flask. The sides of the flask carry positioning lugs 14 by means of which it is aligned with the cope pattern and the drag plate. The flask may be provided with a removable top plate 15 as shown or with supporting bars in the cope flask, the latter being a common expedient in this art.

In order to form the cope section use is made of a pattern as 16, having a raised body portion 17, the top or horizontal face of which is fashioned with the desired mold outline and with suitable recesses 18 for the reception of the individual end cores 19. The sides of the raised portion 17 are preferably divergingly inclined toward the body of the pattern, the angle of inclination being the same as that of the drag pattern sides 9. The pattern also carries the usual positioning or aligning lugs 20.

In forming the cope section, the cores 19 are placed in the recesses 18 and the pattern secured to and aligned with the flask by means of the flask lugs 14 and pattern lugs 20. The flask is filled with sand which is suitably packed whereupon the open sand face is leveled and covered by plate 15, if the latter is used. The unit is now inverted and the pattern removed, or, if desired, the pattern may be held and the flask removed. In this manner the cope is completely formed and ready for the final operations.

In molding of this kind, the use of chaplets is required and the next step involves the placing of the chaplets in the cope and the positioning of the main core in the drag. Both of these operations are described in my companion application and are so readily apparent in the drawings that their description is deemed unnecessary. The mold is completely assembled by properly inverting the cope section of the mold over the drag section and guiding it into position by aligning the drag lugs 4 with the cope lugs 14. By so doing it is apparent that the drag sand will project into the cope flask and fit closely against the sides of the cope sand recess in which position the molding surfaces of the two sections cooperate to outline the complete mold. It will be noted that the mold thus outlined is substantially displaced from the plane of the flask and drag joint line.

Figure 10:
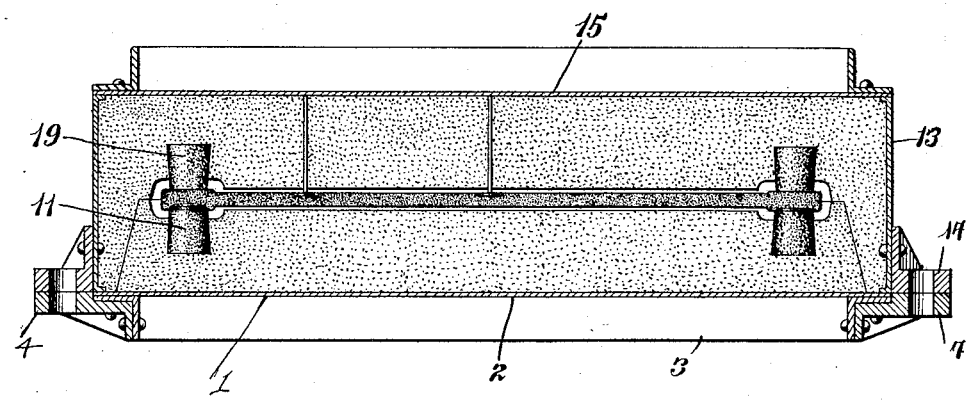
Figure 10 is a sectional view of the complete mold.

The advantages of the present invention will, perhaps, be more thoroughly understood after a comparative consideration of the prior practice and some of its disadvantages. For example, in the prior practice, the parting line of the mold extends from the casting space horizontally along the joint line directly to the sand lock; i. e., the inwardly turned flange provided on the joint line of the cope flask. The purpose of the sand lock is to assist in supporting the sand and while it performs this function to a limited extent, it is obvious that that portion extending along the joint line adjacent the casting space, depends for its support entirely upon the adhesion of the surrounding sand particles. Such portion is, in effect, an unsupported overhanging shoulder which, due to its own weight, is under stress and hence very apt to break off or "drop" as it is termed in the art. This liability necessitates very careful handling of the molds throughout the entire range of operations and thus materially increases the cost of the casting. In the present invention, the liability of the mold to drop is practically eliminated. This is accomplished by making the parting line of the cope extend from the casting space horizontally for a small distance and thence laterally downward to the joint line of the mold adjacent the sand lock from which point it continues along the joint line to the sand lock, as shown in Figure 10. The deep arch or concave construction of the cope mold obtained by this arrangement obviously is inherently stronger than that obtained by the flat cope construction of the prior practice or the convex construction sometimes used. Furthermore, this construction substantially eliminates the overhanging shoulder and places the weight of the sand directly on the sand lock.

Another disadvantage of the prior practice arises from the fact that the joint line faces of the mold sections are made flat. When the mold is assembled, these faces must fit perfectly against each other so as to seal the joint line without crushing the sand of either section. If the joint line is not sealed, the molten metal, during the pouring operation will "run-out", that is to say, pass between the mold sections and spoil the casting while if the sand is crushed the molding surface is liable to be deformed. The arrangement provided by the present invention obviously insures a superior and tighter fit than is obtained in the prior practice and, furthermore, permits a fit such as will effect some crushing effect along the downwardly extending portion of the parting line inasmuch as the sand thereby affected is substantially displaced from the casting space and the crushing forces set up do not extend toward the casting space.

The practice and equipment herein proposed has other advantages among which may be mentioned: that it requires a deeper cope flask resulting in greater rigidity and less maintenance without an increase in the weight of the mold as a whole; that it permits the cope flask to be constructed, for all types of castings, with vertically arranged sand supporting cross bars (which are used alternatively with the plate 15) which extend entirely within the flask and above the joint line, thus decreasing the maintenance over the prior practice wherein some castings require the use of projecting cross bars, these being readily subject to injury; and that it eliminates the drag flask bars, thereby facilitating the shaking-out of the mold. Another feature of the invention lies in the construction of the drag plate which, due to its rigidity prevents the mold from bowing and thus warping the casting.

While the invention has particular utility in connection with the casting of hollow bodies, it is to be distinctly understood that it is not necessarily limited to such use and obviously, may be used in the molding of other bodies, such as solid bodies.

Having described my invention, I claim:

1. A sand molding apparatus comprising a flask for the support of one part of the molding sand and a plate for the support of the other part of the molding sand, said plate adapted to be secured directly to said flask.

2. A sand molding apparatus consisting of at least two parts comprising a flask for the support of one part of the molding sand and a plate for the support of the other part of the molding sand, said plate being adapted for abutting relation with said flask.

3. A sand molding apparatus comprising a flask for the support of the cope sand and a plate for the support of the drag sand, said plate adapted to be secured directly to said flask.

4. A sand molding apparatus comprising a flask for the support of the cope sand, lugs attached to said flask, a plate for the support of the drag sand and lugs attached to said plate, said flask and plate adapted to be aligned with and secured to each other by means of said lugs.

5. A drag plate for the support of the drag sand of a mold comprising a flat plate having lugs attached to opposite sides thereof whereby said plate may be secured to a pattern or cope flask.

6. A drag plate for the support of the drag sand of a mold comprising a flat plate, angle bars secured to the under side thereof, and providing a support therefor, and lugs attached to the opposite sides of said plate providing means for its securement to a pattern or cope flask.

7. A mold including a cope section, the parting face of said section being formed to provide a chamber the horizontal face of which is formed to provide a molding surface and a drag section having a cooperating molding surface and adapted to fit within the cope section when the two sections are assembled thereby to provide a casting space outlined entirely within the cope section and substantially displaced from the plane of the joint line of the cope and drag sections.

8. A mold including a cope section constituting a flared chamber the horizontal face of which outlines the desired molding surface and a drag section formed within a cooperating molding surface and being adapted to fit closely within the flared cope chamber when the cope and drag sections are assembled thereby to provide a casting space outlined entirely within the cope section.

9. A mold comprising cope and drag sections, said cope section having a chamber extending inwardly from the joint line of the cope and drag sections and providing an inwardly located molding surface, said drag section having a cooperating molding surface adapted to extend into said chamber, thereby to provide a casting space outlined entirely within said cope section and substantially displaced from the plane of the joint line of the cope and drag sections.

10. A mold including a cope section, a cope flask enclosing said section, the parting face being formed to provide a chamber the horizontal face of which is formed to provide a molding surface, a drag section having a cooperating molding surface and adapted to fit closely within the cope section when the two sections are assembled thereby to provide a casting space outlined entirely within the cope section and substantially displaced from the plane of the joint line of the cope and drag sections, and a drag plate supporting the drag section and upon which the cope flask rests.

11. A mold including a cope section, a cope flask enclosing said section, the parting face being formed to provide a flared chamber the horizontal face of which is formed to provide a molding surface, a drag section having a co-operating molding surface and adapted to fit closely and conformably within the cope section when the two sections are assembled thereby to provide a casting space outlined entirely within the cope section and substantially displaced from the plane of the joint line of the cope and drag sections, and a drag plate supporting the drag section and upon which the cope flask rests.

12. Equipment for preparing sand molds including a drag pattern having a drag sand chamber and a pattern formation at the base of said chamber in combination with a drag plate formed to be centered on said pattern over said chamber and to support the drag sand when the pattern is removed.

13. Equipment for preparing sand molds including a cope pattern having a raised body portion and a pattern formation upon the upper face of said body portion, a drag pattern having a drag sand chamber and a pattern formation at the base of said chamber in combination with a cope flask formed for connection to said cope pattern and to enclose the cope sand, and a drag plate formed to be centered on said drag pattern over said chamber and to support the drag sand when the pattern is removed, said cope flask and drag plate being available as parts of the mold and being formed for connection to one another.

14. Equipment for preparing sand molds including a cope pattern having a raised body portion and a pattern formation upon the upper face of said body portion, a drag pattern having a drag sand chamber and a pattern formation at the base of said chamber in combination with a cope flask formed for connection to said cope pattern and to enclose the cope sand, and a drag plate formed to be centered on said drag pattern over said chamber and to support the drag sand when the pattern is removed, said cope flask and drag plate being available as parts of the mold, said patterns having positioning lugs and said cope flask and drag plate having positioning lugs for co-operation with the positioning lugs of the respective patterns and for co-operation with one another in the assembly of the mold.

15. Equipment for preparing sand molds including a cope pattern having a raised body portion and a pattern formation upon the upper face of said body portion, the sides of said body portion diverging to the lower face of said pattern, a drag pattern having a drag sand chamber and a pattern formation at the base of said chamber, the sides of said chamber flaring to the top of said drag pattern and being conformable to the sides of the cope pattern, in combination with a cope flask formed for connection to said cope pattern and to enclose the cope sand, a drag plate formed to be centered on said drag pattern over said chamber and to support the drag sand when the pattern is removed, said cope flask and drag plate being available as parts of the mold and being formed for connection to one another.

In testimony whereof I affix my signature.

VERNON J. DAVIS.